United States Patent Office 3,249,813
    Patented May 3, 1966

3,249,813
    RAPID REINSERTION PROTECTION SYSTEM FOR SERIES CAPACITOR BANK
    Murray K. Price, Downsview, Ontario, and Brian J. Gilson, Esindale, Ontario, Canada, assignors, by mesne assignments, to I-T-E Circuit Breaker (Canada) Limited, Port Credit, Ontario, Canada, a limited-liability company of Canada
    Filed Feb. 18, 1963, Ser. No. 259,238
    15 Claims. (Cl. 317—12)

Our invention relates to a protective arrangement for a series capacitor blank in a high voltage alternating current power transmission line, and more particularly to such a protective arrangement which after removing the capacitor bank from the transmission line provides rapid reinsertion, responsive to the clearing up of the line fault condition. Preferably the removal and reinsertion of the capacitor bank is to be accomplished within ten cycles after the initial occurrence of the fault condition.

Series capacitor banks are used in alternating current power transmission lines to improve system operation by neutralizing the line reactance. That is, the power transmission lines themselves are known to be inductive. The existence of such line inductance disadvantageously effects the power factor, transport capacity, stability and voltage regulation of the line. This condition is especially severe in the long distance, extra-high voltage lines (as for example, 230 kv. lines), which are currently coming into more frequent use.

To balance out the inductive reactance of the line, it is known to insert capacitors in series along the line of a sufficient magnitude to compensate for all or part of the line reactance. The voltage appearing across such series capacitors will be directly proportional to load current, therefore subjecting a non-protected series capacitor unit to an excessive voltage during the occurrence of a line fault condition. Although such capacitor units are capable of withstanding moderate overloads for brief periods, they will be subjected to serious damage should the line current exceed its normal value by an extensive amount, i.e. 2½ times line current, even momentarily.

The volume and price of a capacitor generally increases with the square of its maximum current rating. It is therefore economically undesirable to use series capacitors rated greatly in excess of normal line currents. Accordingly, it has become the practice to use a bank of capacitors rated at substantially normal loads, and to provide a rapid bypassing arrangement for the capacitor bank responsive to the presence of excessive fault conditions. The bypass circuit preferably operates almost instantaneously upon the occurrence of a fault in excess of a predetermined level. Such instantaneous operation may be obtained, for example, by an appropriately designed spark gap device in shunt relationship with the capacitor bank.

During the period in which the series capacitor bank is bypassed from the series line, it is effectively removed from aiding to neutralize the inductive reactance of the line. Since the system stability provided by the capacitor bank is particularly important immediately following the clearing up of the fault condition, it is essential that the protective system operate to restore the capacitor to the line as rapidly as possible after the danger of capacitor damage has been dissipated by the clearing up of the fault. Accordingly, our invention is directed to such a protective system for rapidly restoring the capacitor to the line, thereby maximizing its effectiveness while still maintaining adequate protection of the capacitor bank against overload damage. More particularly, our invention relates to a protective arrangement for extinguishing the spark gap bypass circuit and restoring the capacitor bank in series with the transmission line within a ten cycle period from the initiation of the overload condition.

Numerous series capacitor protective arrangements have been previously suggested to obtain such rapid restoration. One such arrangement utilizes an arc gap in the bypass circuit which is made self-clearing by means of an air blast continuously directed through the gap responsive to break-down. The air blast is of sufficient strength to deionize the area between the arc electrodes, extinguishing the arc at every current zero after the arc is struck. Such extinguishment of the arc reinserts the capacitor bank in series with the transmission line. However, since it normally takes a number of cycles for the fault to be cleared, the arc will restrike at half cycle intervals intermediate the current zeroes from the time the arc is initially extinguished to the clearing up of the fault condition. This repetitive restriking of the arc has been found to give rise to transient voltages of sufficient magnitude to harm the capacitor bank. Another disadvantage of this arrangement is the need for the availability of a substantial source of compressed air to provide the continuous arc extinguishing blast.

Another attempt which has been suggested is to interrupt the bypass circuit by various arrangements of fast operating electromagnetic relays and switches, arranged in the circuit to sense the presence or removal of the overload condition. In such systems it has been observed that should normal current continue to flow in the transmission line when the overload condition is removed, the electromagnetic sensitive sensing relays are often times relatively slow in resetting. This is particularly true where the capacitor bank is inserted in the main transmission line from the generating station. Such lines are rarely deenergized, with fault removal usually effected by the appropriate operation of branch line circuit breakers. As a result of such appreciable periods of delay from the time the overload condition ceases to exist to the actuation of the electromagnetic sensing relays, the series capacitor bank will not be reinserted in sufficient time to optimize its effectiveness in maintaining stability and reducing line losses.

Our invention avoids these disadvantages of the previously practiced arrangements by providing a novel bypass circuit arrangement in shunt relationship with the spark gap. The bypass circuit includes the series arrangement of a normally opened and normally closed fast acting switch. The normally opened, or by-pass disconnect switch, is rapidly closed responsive to the conduction of arc current. This provides a low impedance shunt path across the spark gap and capacitor bank, to extinguish the arc while still keeping the capacitor bank out of the transmission line. The opening of the normally closed or bypass interrupter switch is effected by the operation of a fast acting overload release, such as is the subject of copending U.S. patent application, Serial No. 259,233, entitled "Overload Fast Release Relay," filed of even date with the instant application in the name of M. K. Price and assigned to the assignee of the instant invention. This relay is responsive well within the first cycle of the clearing up of the fault condition to actuate the interrupter switch, thereby restoring the series capacitor bank in the high voltage transmission line. In a preferred embodiment of our invention, the operating circuitry for the interrupter switch is in series relationship with a pair of auxiliary contacts controlled by the disconnect switch. This restricts the opening of the interrupter switch to sequentially follow the closing of the bypass circuit by the disconnect switch.

Within the present capabilities of existing commercial equipment, the bypass circuit may include a spring charged disconnect switch and interrupter switch in series relationship, both of which operate within a maximum of four cycles of the actuation of its tripping coil. Further, the fault condition will usually be removed by a line breaker within five cycles of its initial occurrence. Thus, the operation of our novel protective system may be as follows: Immediately upon the occurrence of the fault condition the spark gap will fire, thereby establishing a shunt path for capacitor protection. Within the next cycle the trip coil of the spring motor charged bypass disconnect switch is actuated, completing the bypass circuit well within five cycles from the initiation of the fault condition. A circuit including the fast acting overload release will then actuate the trip coil of spring motor charged bypass interrupter switch within one cycle from the clearing up of the fault by the line breaker. The interrupter switch will then be opened within a maximum time of four cycles from the actuation of its trip coil. Thus it is seen that our protective arrangement serves to instantaneously remove the capacitor bank from the high voltage lines responsive to a fault condition, and provide reinsertion of the capacitor bank into the distribution line within ten cycles from the time the fault condition occurs, but not until the fault condition is removed.

As a further aspect of our invention, a relatively small source of compressed air is energized subsequent to the extinguishment of the arc gap to direct a short puff of air into the gap for the removal of ionized gases. The puff of air is preferably directed into the gap intermediate the closing of the disconnect switch and the opening of the interrupter switch to prevent a restrike of the arc upon opening of the bypass circuit. Advantageously the source of compressed air required for such removal of the ionized gas is of a substantially lesser magnitude than that required in the prior art arrangements which utilize a considerable blast of compressed air to extinguish the arc.

Our invention also contemplates the use of one or more overload responsive sensing members in cooperation with the protective arrangement to effect removal of the capacitor bank in the event of a prolonged moderate overload condition sufficient in magnitude and time duration to damage the capacitor bank, but of insufficient instantaneous value to break down the arc gap.

A preferred embodiment of our invention also contemplates the addition of a lockout series circuit in shunt relationship with respect to the capacitor bank, spark gap and bypass series circuit. Such a lockout series circuit may be actuated responsive to a variety of predetermined system faults such as: excessive capacitor failure resulting in severe current unbalance within the capacitor bank; prolonged spark gap current; overload occurrence during the reset operation of the bypass when it is incapable of operating; and various other mechanical failures. The lockout switch is preferably manually reset after it has operated.

It is therefore seen that the basic concept of our invention resides in the rapid reinsertion of a series capacitor bank into an alternating current transmission line after fault removal, and preferably within a maximum of ten cycles delay after it has been protectively removed from the circuit.

It is therefore a primary object of our invention to provide for rapid reinsertion of a series capacitor bank within a transmission line following the clearing up of the fault condition.

A further object of our invention is to provide for the reinsertion of a protectively removed series capacitor bank within a maximum of ten cycles delay from the inception of the fault condition.

Another object of our invention is to provide a protective arrangement for a series capacitor bank which includes the shunt circuit relationship across the capacitor bank of an arc gap instantaneously responsive to a fault condition and a normally open bypass circuit, the bypass circuit sequentially completed to first extinguish the spark gap and then opened responsive to the clearing up of the fault condition to reinsert the capacitor bank.

An additional object of our invention is to provide such a protective arrangement wherein the arc is extinguished and the capacitor bank subsequently reinserted into the transmission line within a maximum of ten cycles from the ocurrence of the fault condition.

Still a further object of our invention is to provide such a protective arrangement wherein the bypass circuit is opened by an electrically energizable means, actuated within the first cycle after the fault condition is cleared up subsequent to the bypass circuit being completed.

Still another object of our invention is to provide a rapid reinsertion arrangement for a series capacitor installation which includes a spark gap in shunt relationship with the capacitor bank adapted to instantaneously remove the capacitor bank from the transmission line, a circuit arrangement to extinguish the spark gap and reinsert the capacitor bank into the transmission line, and means for applying a relatively small amount of air through the spark gap after it has been extinguished to remove the ionized gases therefrom.

Still an additional object of our invention is to provide a protective arrangement for a series capacitor installation as set forth in the previous objects, which further includes a lockout series circuit in cooperation with the bypass arrangement to remove the capacitor bank from the line responsive to various predetermined system faults, for increased system reliability.

These as well as other objects of our invention will readily become apparent from the following description of the accompanying drawings in which:

FIGURES 4a–f are wave form representations illustrating the operation of the fast acting overload release of FIGURE 2A, corresponding to the lines of FIGURE 3.

The figures for simplicity show only one phase of a power transmission system incorporating our rapid reinsertion protective arrangement. It is naturally understood that in actual practice three similar phases would ordinarily be employed. Also the actual three-phase system might preferably include interphase signalling means for operation of the individual phase protective circuitry in unison responsive to a fault condition in one of the phases. Such interphase signalling may, for example, take the form of motor actuated rotary columns formed of interrelated axial segments appropriately connected to the switching assemblies of the protective arrangement.

Figure 1:
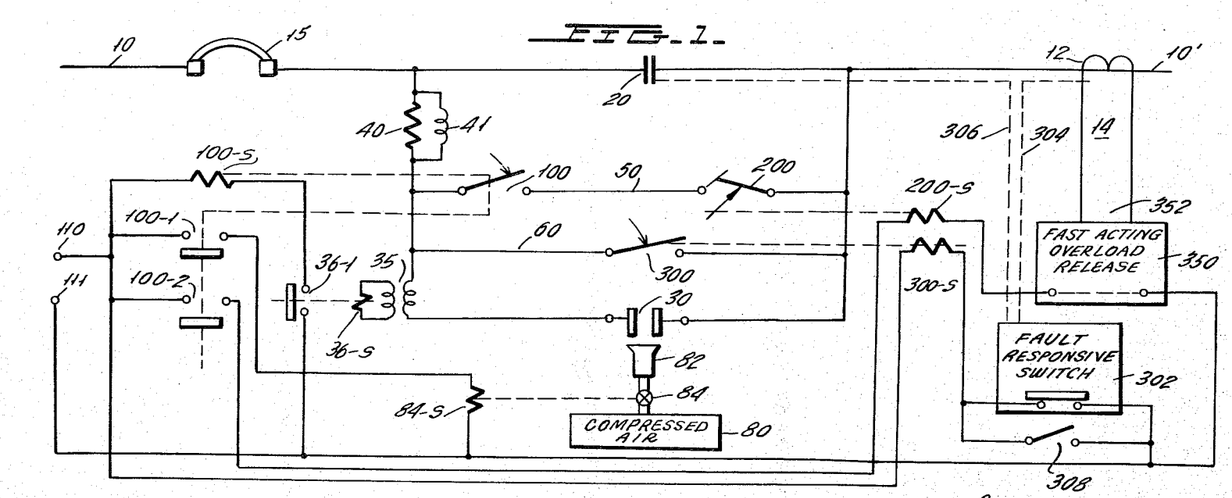
FIGURE 1 is a simplified schematic diagram illustrating the basic operation of a series capacitor protective arrangement constructed in accordance with the preferred teachings of our invention.

Referring to FIGURE 1 the line 10–10' is representative of one of the main transmission lines of a high voltage system, which may for example be a 230 kv. line. Series capacitor bank 20 is installed along the line for the purpose of balancing out the reactive impedance of the line, thereby improving the power factor, to effect an increase in power transport capacity of the line. Although capacitor 20 is diagrammatically shown as a single unit it normally consists of a fairly large installation including a number of individual units connected together in an appropriate series parallel arrangement to yield the necessary capacitive reactance and current rating.

Inasmuch as the interruption of a main line at the generator will cause severe power interruption, it is desirable to remove system faults by the proper operation of line breakers (not shown) situated towards the load end of the line. Accordingly, main transmission line circuit breaker 15 will usually be closed and line current will flow through capacitor bank 20. Upon the occurrence of a fault condition causing excessive currents to flow through line 10, 10', capacitor bank 20 is protected from overvoltages by means of spark gap assembly 30 connected in shunt relationship with respect to the capacitor bank. Spark gap 30 is of an appropriate design, such as of the type shown in copending U.S. patent application Serial No. 234,770, entitled "Adjustable Precision Spark Gap," filed November 1, 1962, in the name of Otto Jensen, and assigned to the assignee of the instant invention, to break down and immediately become conducting when subjected to an instantaneous fault voltage, which would otherwise subject the capacitor bank 20 to serious damage. The parallel arrangement of resistor 40 and inductor 41 is preferably connected in series with the arc shunt circuit to limit the magnitude of the discharge current from capacitor bank 20 when the spark gap 30 initially breaks down, and to damp out oscillations of the capacitor discharge current.

Bypass series circuit 50 is provided in shunt relationship with respect to both capacitor bank 20 and spark gap 30. Bypass circuit 50 includes the series relationship of normally opened switch 100 and normally closed switch 200 which serves the purpose, as will be set forth below, of rapidly extinguishing the arc and reinserting the capacitor bank 20 back into the line responsive to the clearing up of the fault condition. Switches 100 and 200 are suitable fast acting devices, preferably of the spring motor charged variety, trip-biased to their other position and quickly operative responsive to the energization of trip-coil solenoids 100–s and 200–s respectively. Actuating solenoid 100–s is connected to terminals 110, 111 of an apropriate energizing potential source, through the series circuit including contact pair 36–1. Contact pair 36–1 is controlled by output relay 36–s of current sensitive tap-off 35 responsive to the flow of arc gap current. The breakdown of arc-gap 30, accompanied by the flow of arc current, energizes 36–s to close contacts 36–1 and thereby complete the energizing path of actuating solenoid 100–s to close switch 100. The closing of switch 100 completes bypass circuit 50 which by providing a lower impedance path than that of arc gap device 30 serves to extinguish the arc gap.

Rapid restoration of capacitor bank 20 in series with the transmission line is provided by the subsequent opening of switch 200. Actuating solenoid 200–s is connected to energizing source terminals 110, 111 through the series circuit arrangement of fast acting overload release 350 and contacts 100–2, the latter being auxiliary contacts closed responsive to the closing of switch 100. The fast acting overload release 350 includes an input 352 connected to line current pick-off device 12 to be responsive to the clearing up of the overload condition. As will be subsequently discussed, fast acting overload release 350 is designed to operate in sufficient time from the clearing up of the fault condition to effect reinsertion of capacitor bank 20 into the transmission line 10–10' within ten cycles from the time the fault initially occurs. As previously discussed in some prior art arrangements the fast acting release 350 consisted of an electromagnetic relay coil or an appropriate circuit arrangement of such relay coils energized by a source proportionally related to the overload condition. While such relays may be designed to reset in a fairly rapid manner when the coil current approaches zero, they have been found to be relatively slow setting where normal current remains on the line upon the removal of the fault condition, such as is the usual case in the main transmission line. The protective arrangement of our invention preferably avoids this by using an overload release sensitive to the return of normal load, which may be of the type set forth in above-mentioned copending U.S. patent application Serial No. 259,233.

As an additional preferable aspect of our invention, a small source of compressed air 80 is provided to a suitable outlet valve 82 positioned to emit a relatively short puff of air into the area enclosed by spark gap device 30. The emission of such air into the spark gap is controlled by valve 84, actuating solenoid 84–s of which is series connected to energizing source terminals 110, 111 through auxiliary contacts 100–1 controlled by the closing of by-pass disconnect switch 100. Actuating coil 84–s is appropriately time delayed such that the compressed air is emitted into the spark gap 30 as a short puff after the arc therebetween is extinguished, and is for the sole purpose of removing the ionized gases from the spark gap. This operation is timed to occur prior to the opening of interrupter switch 200, thereby preventing restriking of the arc at lower than its adjusted value at such time as interrupter 200 is opened. It is to be noted that inasmuch as compressed air source 80 need only be used for a short interval to remove ionized gases after the arc is extinguished, it may be a substantially lesser source than that used in prior art arrangements wherein a compressed air source provides a strong blast of air for a sufficient duration to actually extinguish the arc.

Our invention also contemplates a lockout series circuit 60 in shunt relationship with the capacitor bank 20 and protective shunt circuits 30 and 50. Lockout series circuit 60 includes a normally opened fast acting disconnect switch 300, actuated by solenoid 300–s. Solenoid 300–s is series-connected to energizing source terminals 110, 111 through a device 302 generally referred to as a fault responsive switch in FIGURE 1, and more fully shown in FIGURE 2. Fault responsive switch 302 may include one or more system fault sensing inputs shown generally as 304, 306 which operatively control fault responsive switch 302 to complete the actuating circuit of solenoid 300–s. As will subsequently be discussed on conjunction with FIGURE 2, fault responsive switch 302 may be operated, by such fault conditions as: a serious current unbalance within the capacitor bank, overload during the bypass reset operation or a prolonged flow of spark gap current. A switch 308 is also shown connected in parallel across fault responsive switch 302. Switch 308 may be manually operable or operable by remote control to permit removal of the capacitor bank.

Figure 2:
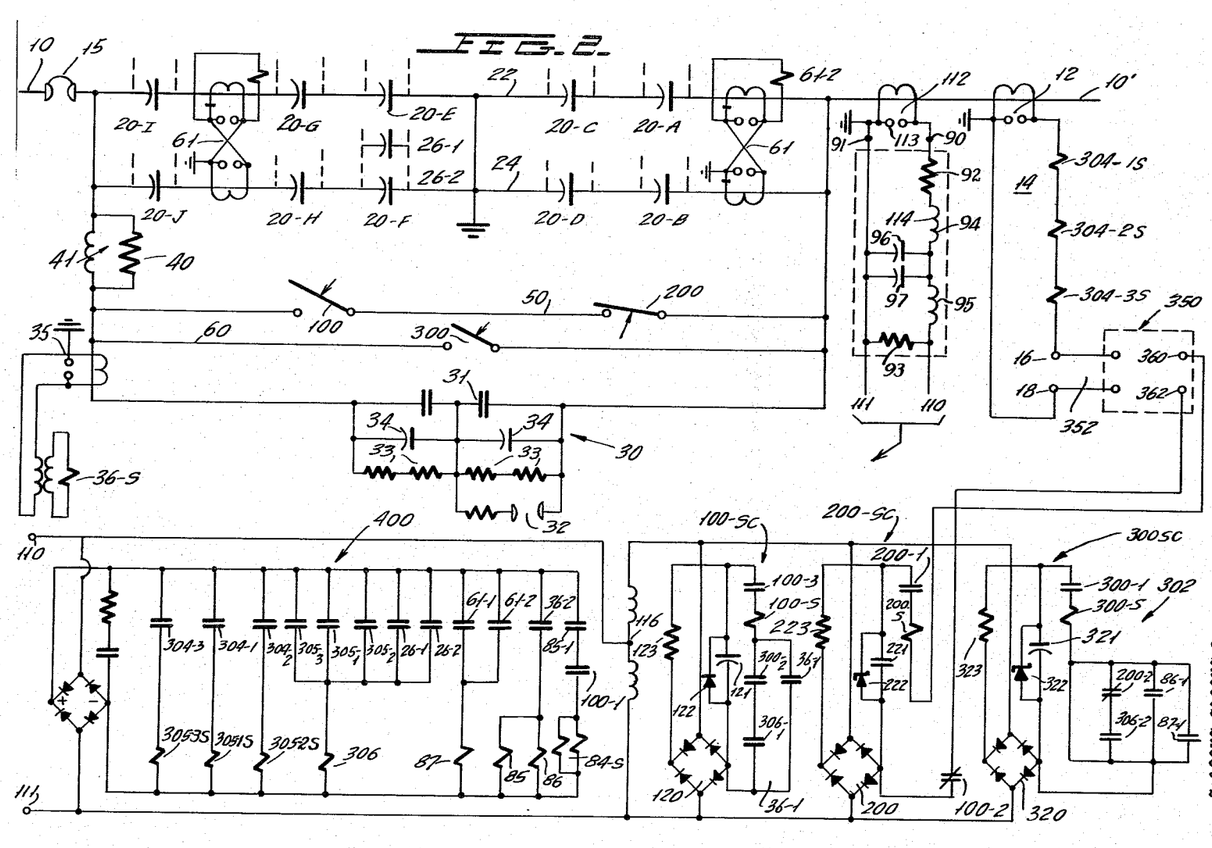
FIGURE 2 is a diagrammatic representation of a single phase of a high voltage distribution line system having a series capacitor installation in accordance with a preferred embodiment of our invention.

Reference is now made to FIGURE 2 which diagrammatically illustrates a capacitor bank protective arrangement located at one phase of a high voltage transmission line, and wherein like numerals have been used to indicate those components previously designated in FIGURE 1. Capacitor bank 20 is seen to comprise a plurality of individual capacitor racks 20–A—20–J, connected in a series parallel relationship. Line 10, 10' may typically be the main transmission line of a 230 kva. system, which would accordingly require a considerable number of individual capacitor units to provide the appropriate amount of neutralizing capacitive reactance. For increased economy and reduced space requirements, it has been found preferable to form the individual capacitor racks of primarily 100 kvar. capacitors, such as the 4160 volt units shown in FIGURES 5, 5A.

For increased capacitor protection, capacitor bank 20 preferably includes appropriate current unbalance sensers 61 responsive to a serious unbalance condition between the lines 22, 24. Also, one or more of the capacitor racks, such as 20–F, includes thermally responsive switch means 26–1, 26–2. As will be subsequently discussed, the outputs 61-1, 61-2 of the current unbalance senser and 26-1 and 26-2 of the thermal device are operatively interconnected to the protective arrangement for removing the capacitor bank from line 10-10' under such conditions which may not have resulted in operation of the spark gap 30. Spark gap 30 may be of the general type discussed in aforementioned patent application Serial No. 234,770, and includes main gap 31, precision gap 32, resistors 33 and capacitors 34 to provide rapidly triggered and accurate break-down.

16. The control system energizing potential appearing between terminals 110, 111 is preferably obtained from transmission line 10-10', such as in the manner which is the subject of U.S. patent application Serial No. 259,181, entitled "Constant Voltage Source for Operation of Series Capacitor Bank Protective Equipment" filed of even date with the instant application and assigned to the assignee of the instant invention. Such a voltage source is provided by saturable core transformer 112 and low pass filter 114 constructed to maintain a comparatively constant A.C. voltage between output terminals 110, 111 under widely varying conditions of line load current. As, for example, the constant voltage source arrangement set forth in the aforementioned copending U.S. patent application Serial No. 259,181 maintains the output voltage variation between 70 and 140 volts corresponding to line current variations from 50 to 6,000 amperes. This arrangement preferably avoids both the necessity of an auxiliary power source separate and distinct from the main power source, and the considerable expense of a potential transformer which would otherwise be required to go from the 230 kva. main line to a nominal 110 volt control circuit voltage. This advantageously permits all of the auxiliary equipment required to operate for the protection of the capacitor bank to be maintained at the platform level. A suitable tap-off device 12 is provided along the line 10-10' to provide a current flow through series path 14, proportionally related to line load. Circuit 14 includes output terminals 16, 18 which supply the input signal 352 to the fast acting overload release circuitry generally shown as 350. Circuit 14 is also shown as including a number of relays 304-1, 304-2, 304-3, connected to time delay relays appropriately designed to pick up responsive to the existence of predetermined moderate overload conditions for prolonged periods of time.

The solenoid actuating circuits of fast acting protective system switches 100, 200, 300 are generally shown as 100–sc, 200–sc and 300–sc respectively. These circuits are parallel connected to potential source 110, 111, as for example via auto transformer 116. The control voltage available from the output of auto transformer 116 is presented to rectifying and voltage stabilizing circuitry of each of the solenoid actuating circuits to provide a constant source of D.C. potential. This circuitry includes bridge rectifier 120, capacitor 121, zener diode 122 and resistor 123, as shown in the input of circuit 100–sc. Similarly, components 220–223 and 320–323 are shown included in circuits 200–sc and 300–sc. The potential source terminals 110, 111 are also presented to a control circuit arrangement generally shown as 400, which as will be subsequently discussed is operatively associated with the solenoid control circuits of the protective switching arrangement to afford capacitance bank protection responsive to a variety of system abnormalities.

System operation

Responsive to an excessive voltage condition above a certain predetermined level, spark gap device 30 will rapidly fire striking an arc therebetween to shunt remove capacitor bank 20 from the line. The flow of arc current is sensed by 35, thereby actuating relay solenoid 36–s. This causes the closing of contact 36-1, located in the disconnect switch actuating circuitry 100–sc. The closing of contacts 36-1 completes the actuating circuit for solenoid 100–s through the normally closed auxiliary contacts 100-3. Fast acting disconnect switch 100 is then closed to extinguish the arc by diverting current through bypass path 50. The closing of disconnect switch 100 also serves to close auxiliary contacts 100-1, 100-2 and open auxiliary contact 100-3. Disconnect switch 100 may also include other auxiliary contacts (not shown) to initiate the spring motor charging of its operating spring, and provide interphase signalling.

The closing of contacts 100-2 provides an energizing path for interrupter solenoid 200–s through normally closed auxiliary contact 200-1, and terminals 360, 362 of fast acting overload release 350. As will be subsequently discussed in conjunction with the circuitry of 350, terminals 360, 362 are operatively related to line condition to be rapidly closed upon the clearing up of the fault condition. Upon such closing of terminals 360, 362, solenoid 200–s will be energized. Fast acting interrupter switch 200 is then opened, serving to reinsert capacitor bank 20 in series relationship with the transmission line 10-10'.

Figures 3, 4:
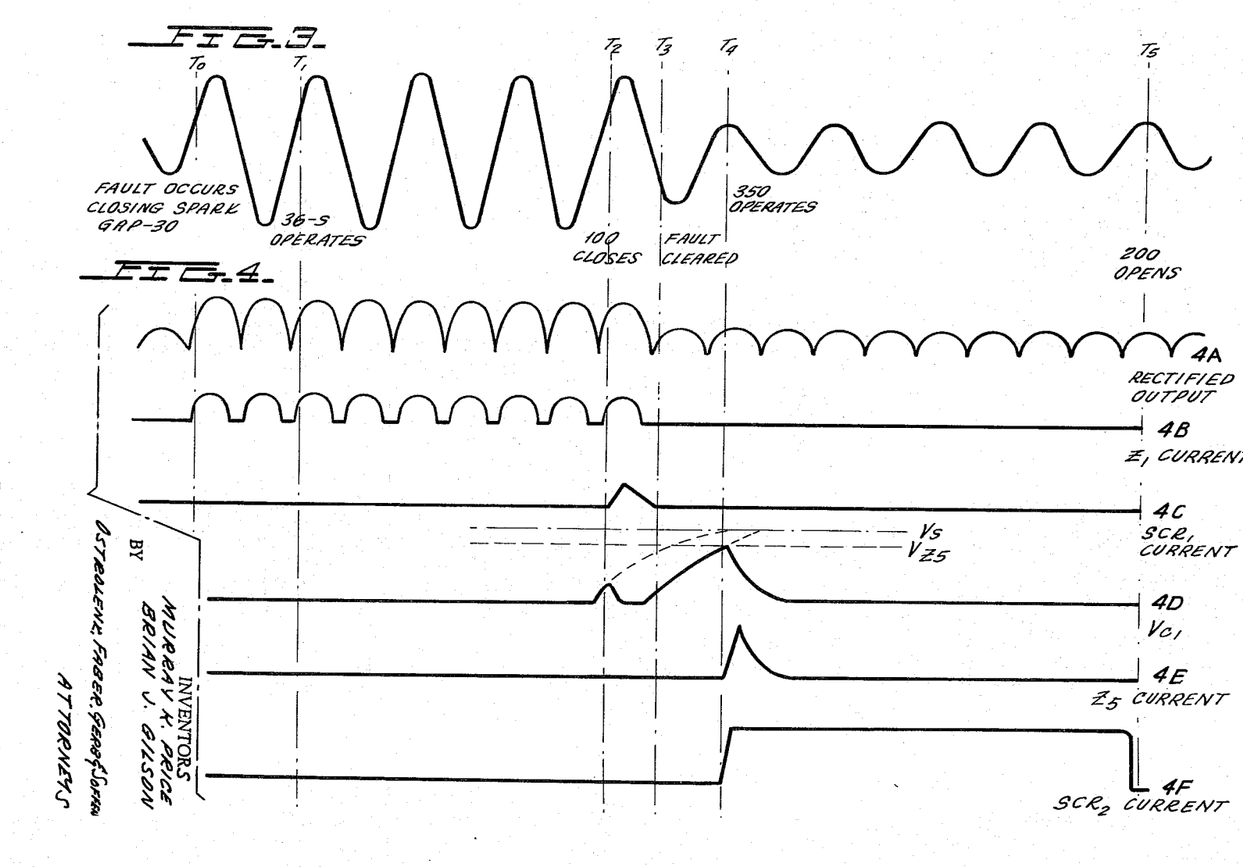
FIGURE 3 is a representative wave form diagram of line load during the occurrence and clearing up of an overload fault, and indicating the time sequence of operation of our rapid reinsertion system.

Reference is now made to FIGURE 3, which illustrates the sequential timing of rapid capacitor reinsertion provided by our invention. Time $T_0$ corresponds to the occurrence of the fault condition, and the substantially instantaneous firing of the spark gap device 30. Current senser 35 and its operating relay 36 are of a standard commercial variety, operable to close contact 36-1 in a maximum period of one cycle from the occurrence of arc current, at which time ($T_1$) disconnect tripping solenoid 100–s is energized. Bypass disconnect switch 100, of a conventional design to safely withstand the high capacitor bank ratings, is operable within the present capabilities of the art to close within approximately three cycles from the energization of tripping solenoid 100–s. Thus, at $T_2$ approximately four cycles from the initiation of the fault condition, bypass circuit 50 is completed to extinguish the arc. The line is protected by a suitable arrangement of circuit breakers (not shown) which, for most fault conditions, will remove the fault from main transmission line 10-10' within 4-5 cycles after $T_0$. The removal of the fault condition at $T_3$ is sensed by overload release 350 which (in the manner subsequently discussed, which is the subject of above-mentioned copending U.S. patent application Serial No. 259,233) operates within ¾ of a cycle from $T_3$ to close the circuit gap between terminals 360, 362. At this time, $T_4$, solenoid 200–s of fast-acting interrupter switch 200 is energized. Interrupter switch 200 may be operable within the present capabilities of the art to open its contacts within a maximum of four cycles from the energization of coil 200–s. Thus, it is seen that our protective system provides reinsertion of capacitor bank 20 within a ten cycle period from the initial fault condition, while preventing reinsertion until the fault is removed.

Referring again to FIGURE 2 the operation of other aspects of our invention will now be considered.

The actuation of arc current sensing relay 36–s and the closing of its associated contacts 36-2 energizes relay 85, thereby closing its contacts 85-1. Contacts 85-1 are in series circuit relationship with air valve actuating solenoid 84–s and normally opened auxiliary contacts 100-1, the latter being closed by the closing of bypass disconnect switch 100. Thus, upon picking up of relay 85 and the closing of bypass disconnect switch 100, air valve solenoid 84–s will be actuated to provide a puff of air into the main spark gap 30 for cleaning away the ionized gases (schematically shown in FIGURE 1). The pickup of relay 85 and the energization of air valve solenoid 84–s are appropriately time related such that the puff of air will be emitted into the spark gap subsequent to arc extinguishment by the closing of disconnect switch 100, but prior to the opening of interrupter switch 200.

The pickup of any of the moderate overload sensing relays 304-1S, 304-2S, or 304-3S, closes its associated contact 304-1, 304-2 or 304-3 located in the general control circuitry shown as 400. The closing of any of such contacts energizes one of its associated time delayed relays 305–1S, 305–2S or 305–3S, closing associated contacts of the latter 305–1, 305–2 or 305–3 responsive to the moderate overload condition existing for predetermined time intervals. Contacts 305–1, 305–2 and 305–3 are in parallel relationship with respect to the contacts 26–1, 26–2, controlled by the output of the thermal device located within the capacitor bank. Hence, the existence of any one of a plurality of predetermined moderate overload conditions for a continuous interval, or of an excessive temperature condition within the capacitor bank 20 serves to energize relay coil 306 in series relationship with respect to the aforesaid parallel arrangement of contacts. The energization of relay 306 will close its contacts 306–1, 306–2, located in the general circuitry of 100–sc, and 302 respectively.

Contact 306–1 is in series relationship with actuating solenoid 100–s, through auxiliary contact 300–2 (closed when lockout switch 300 is in its normally opened position) and auxiliary contacts 100–3 (closed when disconnect switch 100 is in its normally open position). Thus it is seen that the actuation of coil 306 responsive to the aforedescribed moderate overload or capacitor bank thermal conditions will serve to actuate bypass disconnect switch 100, providing that lockout switch 300 has not been closed and switch 100 has not already been actuated responsive to arc current.

Contact 306–2 is similarly in series relationship with actuating solenoid 300–s of the lockout switch through series connected contacts 300–1 (closed when lockout switch 300 is in its normally open position), 200–2 (closed when interrupter 200 has been operated to its opened position). Thus, the actuation of relay 306 will alternately actuate lockout switch 300 to close auxiliary bypass circuit 60 should the circuit fault condition occur subsequent to the sequential operation of switches 100 and 200, and before they have been reset to their original positions.

Lockout switch 300 may alternatively be energized by the closing of contacts 86–1 or 87–1. The closing of contacts 86–1 is governed by the operation of time delay relay 86 in the circuit of arc current sensing contact 36–2. Thus, current flow through the spark gap for an extended length of time will serve to close lockout switch 300, via time delay relay switch 86. Contacts 87–1 are closed by the actuation of relay 87. Relay 87 is in series relationship with contacts 61–1, 61–2 of the capacitor bank current unbalance sensers, and will be actuated responsive to a predetermined unbalance condition.

*Fast acting overload release*

Figure 2A:
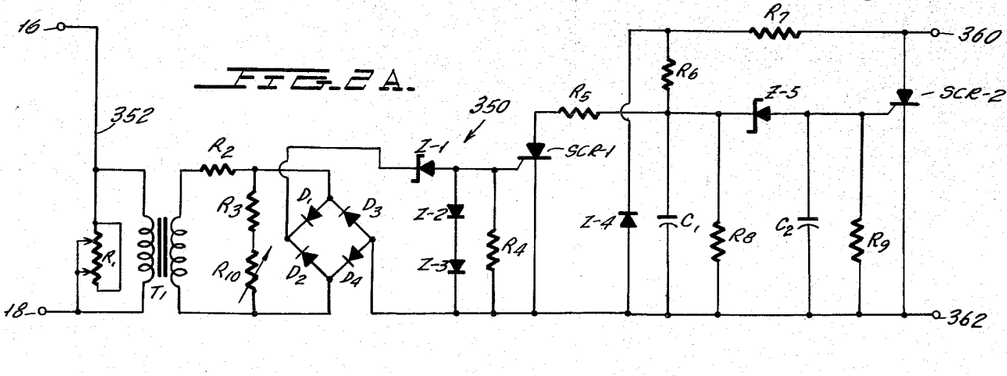
FIGURE 2A is a schematic diagram of a fast acting overload release of the type set forth in above-mentioned U.S. patent application Serial No. 259,233, operative to rapidly actuate the by-pass interrupter responsive to fault removal.

Proper timing for the actuation of bypass interrupter 200 may be provided by a circuit arrangement such as 350, of FIGURE 2A, which is the subject of above-mentioned copending U.S. patent application Serial No. 259,233. The input signal 352 at terminals 16, 18 is generally sinusoidal and proportional in magnitude to line load in the manner shown in FIGURE 3. This signal is then applied to adjustable resistor R1, connected to the input terminals of transformer T1. Transformer T1 appropriately amplifies the load responsive signal, which is then presented to a full wave rectifier circuit comprising the bridged arrangement of diodes D1–D4. The full wave rectifier output signal is shown by wave form 4A. Zener diode Z–1 is selected such that when the magnitude of the signal 4A presented to its exceeds a value representative of an overload condition, it will break down and become conducting. Thus, referring to wave form 4B of the current condition through zener diode Z–1, breakdown occurs at half-cycle intervals from $T_0$–$T_3$, the time during which the fault remains on the line and the rectified signal 4A is of a magnitude representative of a line fault condition. Zener diode signal 4B, characterized by the half cyclic breakdown of zener diode Z–1 corresponding to the presence of an overload condition, is then applied as a gating signal to silicon control rectifier SCR–1. The circuit of SCR–1 is completed through R–5, R–6, and R–7 at time $T_2$ corresponding to the closing of disconnect switch auxiliary contact 100–2 (refer to FIGURE 2 for the circuit relationship of 100–2). The circuit of SCR–1 is designed such that it will not fire unless Z–1 breaks down to apply a gating signal thereto. Thus SCR–1 will fire during the time an overload condition is sensed by the lefthand portion of the circuit as shown in FIGURE 2A. Further, the circuit parameters of SCR–1 are carefully chosen such that it will cease conducting every half cycle each time the signal to its gate passes through zero.

Referring to wave form 4c of the current through SCR–1, firing occurs from time $T_2$ at half cycle intervals during the application of gate signal 4B, with SCR–1 conduction ceasing at zero gate. Only one such firing is shown in the particular timing sequence shown in FIGURE 4, inasmuch as the illustrative system operation provides a short interval between $T_2$ and $T_3$. However, should the fault remain for a longer interval after $T_2$, SCR–1 will similarly break down and become conducting every half cycle within such an interval till the fault is removed.

Closing of auxiliary contacts 100–2 of the bypass disconnect switch causes capacitor C–1 to be charged towards source potential through the series arrangement of resistors R–6 and R–7. The parameters of capacitor C–1, R–6 and R–7 are chosen in conjunction with the magnitude of the control system source potential such that it will take approximately ¾ of a cycle for capacitor C–1 to reach a potential corresponding to the breakdown potential of zener diode Z–5. Also, the firing of SCR–1 by the overload responsive signal gate 48 is sequentially arranged with the charging of C–1 such that SCR–1 fires before C–1 will reach the breakdown potential of zener diode Z–5. The firing of SCR–1 provides a low impedance shunt path across capacitor C–1, thereby discharging the capacitor and preventing it from reaching a voltage sufficient to fire zener diode Z–5.

Upon clearing up of the fault at time $T_3$, SCR–1 will cease firing, permitting C–1 to reach a potential sufficient to cause zener diode Z–5 to break down and become conducting. This condition is represented by wave form 4–D of the capacitor voltage. At time T–2 corresponding to the completion of the capacitor charging circuit, C–1 begins to charge towards source potential at a rate determined by R–6, R–7 and C–1. Upon firing of SCR–1 a low impedance path is provided across the capacitor thereby rapidly discharging C–1. At time T–3 the fault has been removed, and SCR–1 remains in its nonconducting state. Since the charging of capacitor C–1 is no longer interrupted by the firing of SCR–1, the capacitor continues to charge until the breakdown voltage, VZ5, of zener diode Z–5 is reached. This will occur within a maximum period of ¾ of a cycle from fault removal at $T_3$, resulting in a gating signal shown in 4E to be applied to SCR–2. SCR–2 will then fire and become conducting to provide a low impedance path between output terminals 360, 362. The effective closing of the circuit between terminals 360, 362 will then permit sufficient current flow in circuit 200–sc to actuate the interrupter trip solenoid 200–s. It is thus seen that the circuit arrangement of 350 combines the output of an overload responsive section and a timing section to provide actuation of the interrupter switch for restoration of the capacitor bank within approximately ¾ of a cycle from the clearing up of the fault condition. A ¾ cycle timing arrangement is preferably provided in the above described half-cycle peak current scan arrangement to provide a safety factor between the sequential operation of the overload responsive and timing sections.

Variable resistors R–1 and R–10 are preferably provided to serve as coarse and fine adjustments respectively, to correlate the input signal magnitude at 16–18 to the individual characteristics of Z–1 and SCR–1. Small zener diodes Z–2, Z–3 are provided for the protection of SCR–1 in the event of an excessively large gate signal. Resistor R–4 is provided to stabilize the operation of SCR–1. Similarly, resistor R–9 and capacitor C–2 are provided to stabilize the operation of SCR–2. Zener reference diode Z–4 is provided across R–6 and C–1 to maintain a constant time delay during periods of supply voltage fluctuation. A high magnitude resistor R–8 is applied across capacitor C–1 to discharge any partial charge remaining on the capacitor.

Figure 5:
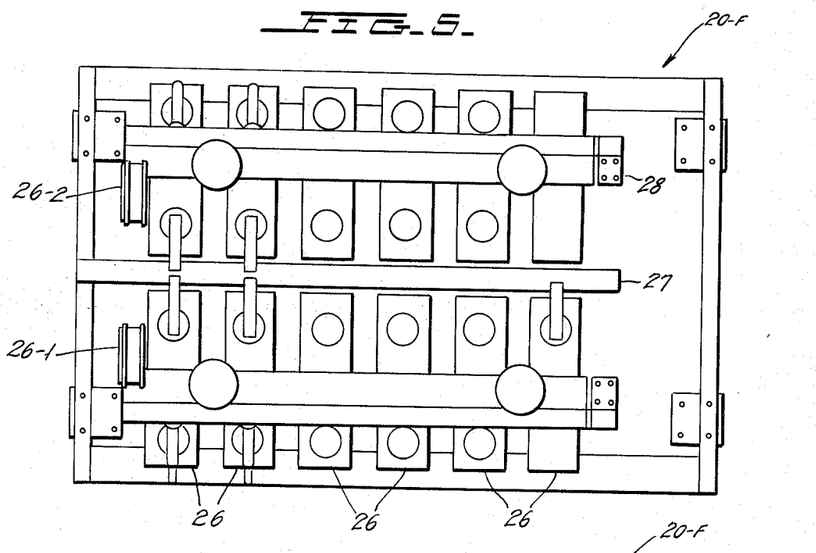
FIGURES 5 and 5a are plan and side views respectively of a typical capacitor rack assembly included in the series capacitor blank, showing the use of 100 kvar. units and a thermally responsive switch.
Figure 5A:
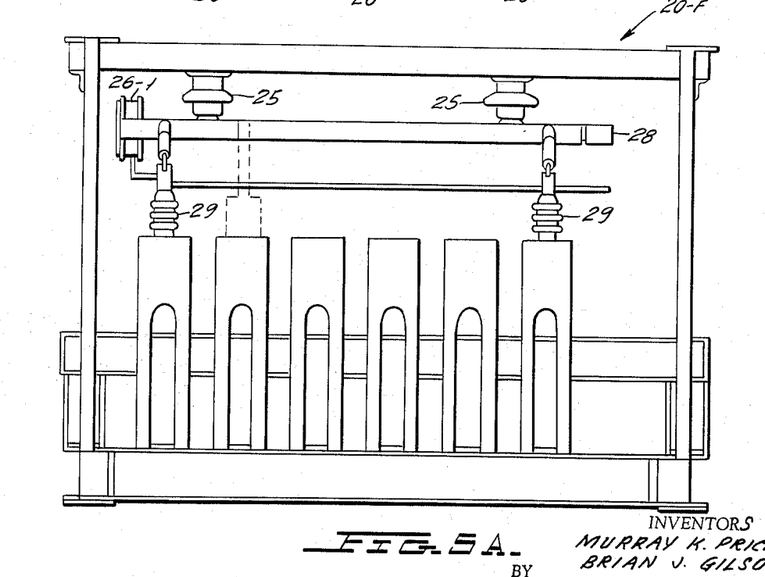

FIGURE 5 and 5a represent a typical capacitor rack such as 20–F, which may be used in capacitor bank 20. A plurality of interconnected capacitors 26 which for increased economy and space consideration may preferably be 100 kvar. units are suitably mounted to the base of support structure 28. The upper terminals 29 are appropriately connected to longitudinal bus members 27, 28, set off from the upper region of the support structure by insulators 25. Capacitor rack 20–F also includes thermally sensitive devices 26–1, 26–2 located within the rack and adjusted to operate responsive to temperatures in excess of a predetermined value. As is shown in FIGURE 2, the output of thermal devices 26–1, 26–2 are operatively connected to the protective arrangement to remove the capacitor bank from the line when subjected to such excessive temperature conditions.

It is therefore seen that our invention provides an improved protective arrangement for the removal of a series capacitor bank in the event of a system fault and for the rapid reinsertion of the capacitor bank upon the clearing up of the fault condition.

Although we have described preferred embodiments of our novel invention, many variations and modifications will now be obvious to those skilled in the art, and we prefer therefore to be limited not by the specific disclosure herein but only by the appended claims.

We claim:

1. In an electrical distribution system, a series capacitor installation comprising a capacitor bank to be series connected to an alternating current line, a spark gap means in shunt circuit relationship with respect to said capacitor bank to break down and immediately become conducting when subjected to an instantaneous fault voltage in excess of a predetermined level; a bypass series circuit in shunt circuit relationship with respect to both said capacitor bank and said spark gap means; said bypass series circuit including a first normally open switch means and a second normally closed switch means; each of said switch means quickly operable to its other position responsive to predetermined circuit conditions; said first switch means operable to its closed position responsive to said spark gap means conducting so that said series bypass circuit is completed to extinguish the arc across said spark gap means; said second switch means operable to its open position responsive to said first switch means being closed and a predeterminel fault condition being cleared up, so that said bypass series circuit is interrupted to reinsert said capacitor bank in said alternating current line; said bypass series circuit being characterized by the ability to reinsert said capacitor bank within ten cycles after the initiation of the fault condition; an electrically energizable means actuating said second switch means into said open position; said electrically energizable means connected in circuit relationship with a first and second condition responsive means to an energizing source; said first condition responsive means being responsive to said first switch means position; said second condition responsive means being responsive to the removal of the line fault condition, and being characterized in that said electrically energizable means is connected to said energizing source after said first switch means is moved to its closed position and the fault condition is cleared up.

2. In an electrical distribution system, as set forth in claim 1; means for applying a stream of air through said spark gap means after the arc thereacross has been extinguished; said air stream being of sufficient strength and duration to substantially remove the ionized gases from said spark gap means, said strength and duration being substantially less than that required to extinguish the arc.

3. In an electrical distribution system, a series capacitor installation comprising a capacitor bank series connected to an alternating current line, a spark gap means in shunt circuit relationship with respect to said capacitor bank to break down and immediately become conducting when subjected to an instantaneous fault voltage in excess of a predetermined level; a bypass series circuit in shunt circuit relationship with respect to both said capacitor bank and said spark gap means; said bypass series circuit including a first normally open switch means and a second normally closed switch means; each of said switch means quickly operable to its other position responsive to perdetermined circuit conditions; said first switch means operable to its closed position responsive to said spark gap means conducting so that said series bypass circuit is completed to extinguish the arc across said spark gap means; said second switch means operable to its open position responsive to said first switch means being closed and a predetermined fault condition being cleared up, so that said series bypass circuit is interrupted to reinsert said capacitor bank in said alternating current line; an electrically energizable means actuating said second switch means into said open position; said electrically energizable means connected in circuit relationship with a first and second condition responsive means to an energizing source; said first condition responsive means being responsive to said first switch means position; said second condition responsive means being responsive to the removal of the line fault condition, and being characterized in that said electrically energizable means is connected to said energizing source after said first switch means is moved to its closed position and the fault condition is cleared up.

4. In an electrical distribution system, a series capacitor installation comprising a capacitor bank series connected to an alternating current line, a spark gap means in shunt circuit relationship with respect to said capacitor bank to break down and immediately become conducting when subjected to an instantaneous fault voltage in excess of a predetermined level; a bypass series circuit in shunt circuit relationship with respect to both said capacitor bank and said spark gap means; said bypass series circuit including a first normally open switch means and a second normally closed switch means; each of said switch means quickly operable to its other position responsive to predetermined circuit conditions; said first switch means operable to its closed position responsive to said spark gap means conducting so that said series bypass circuit is completed to extinguish the arc across said spark gap means; said second switch means operable to its open position responsive to said first switch means being closed and a predetermined fault condition being cleared up, so that said series bypass circuit is interrupted to reinsert said capacitor bank in said alternating current line; an electrically energizable means actuating said second switch means into said open position; said electrically energizable means connected in circuit relationship with a first and second condition responsive means to an energizing source, said first condition responsive means being responsive to said first switch means position; said second condition responsive means being responsive to the removal of the line fault condition, and being characterized in that said electrically energizable means is rapidly connected to said energizing source within the first cycle after said first switch means is moved to its closed position and the fault condition is cleared up; means for applying a stream of air through said spark gap means after the arc thereacross has been extinguished; said air stream being of sufficient strength and duration to substantially remove the ionized gases from said spark gap means, the strength and duration of said air stream being substantially less than that required to extinguish the arc; said means for applying a stream of air including an electrically energizable air actuating means; said air actuating means being in circuit relationship with means responsive to said bypass series circuit condition, such that said stream of air is applied through said spark gap upon said first switch means being closed and before said second switch means is opened.

5. In an electrical distribution system, as set forth in claim 1, a lockout series circuit in shunt relationship with respect to said capacitor bank, spark gap means and bypass series circuit; said lockout series circuit including a third normally open switch means; electrically energizable lockout means actuating said third switch means into its closed position; said electrically energizable lockout means connected in circuit relationship with distribution system fault responsive means whereby said lockout series circuit provides a shunt path responsive to a predetermined system fault.

6. The electrical distribution of claim 5, wherein said distribution system fault responsive means includes thermal responsive means operatively located within said capacitor bank to sense capacitor temperature.

7. The electrical distribution of claim 5, wherein said distribution system fault responsive means includes thermal responsive means operatively located within said capacitor bank to sense capacitor temperature; said thermal responsive means being in circuit relationship with an intermediate control means; said intermediate control means controlling the open and closed positions of a first intermediate switch means; said first intermediate switch means being in series circuit relationship with said lockout means and means responsive to said bypass series circuit condition, such that said lockout means is connected to an energizing source upon said first intermediate switch means being closed and said bypass series circuit being open at a time corresponding to the reinsertion of said capacitor bank.

8. The electrical distribution of claim 5 wherein said distribution system fault responsive means includes current unbalance responsive means operatively located within said capacitor bank to sense abnormal current conditions within said capacitor bank.

9. The electrical distribution system of claim 5 wherein said distribution system fault responsive means includes time delay switch means responsive to current flow through said spark gap means for an extended length of time.

10. In an electrical distribution system, a series capacitor installation comprising a capacitor bank series connected to an alternating current line, a spark gap means in shunt circuit relationship with respect to said capacitor bank to break down and immediately become conducting when subjected to an instantaneous fault voltage in excess of a predetermined level; a bypass series circuit in shunt circuit relationship with respect to both said capacitor bank and said spark gap means; said bypass series circuit including a first normally open switch means and a second normally closed switch means; each of said switch means quickly operable to its other position responsive to predetermined circuit conditions; said first switch means operable to its closed position responsive to said spark gap means conducting so that said series bypass circuit is completed to extinguish the arc across said spark gap means; said first switch means alternatively operable to its closed position responsive to other predetermined system faults not resulting in said spark gap means conducting; said completed bypass circuit operatively removing said capacitor bank from said alternating curent line; said second switch means operable to its open position responsive to said first switch means being closed and a predetermined fault condition being cleared up, so that said bypass series circuit is interrupted to reinsert said capacitor bank in said alternating current line; an electrically energizable means actuating said second switch means into said open position; said electrically energizable means connected in circuit relationship with a first and second condition responsive means to an energizing source; said first condition responsive means being responsive to said first switch means position; said second condition responsive means being responsive to the removal of the line fault condition, and being characterized in that said electrically energizable means is connected to said energizing source after said first switch means is moved to its closed position and the fault condition is cleared up; means for applying a stream of air through said spark gap means after the arc thereacross has been distinguished; said air stream being of sufficient strength and duration to substantially remove the ionized gases from said spark gap means, the strength and duration of said air stream being substantially less than that required to extinguish the arc; said means for applying a stream of air including an electrically energizable air actuating means; said air actuating means being in circuit relationship with means responsive to said bypass series circuit condition, such that said air actuating means is connected to an energizing source upon said first switch means being closed and before said second switch means is opened.

11. The electrical distribution system of claim 10, further including thermal responsive means operatively located within said capacitor bank to sense capacitor temperature; said thermal responsive means in circuit relationship with means operating said first switch means.

12. The electrical system of claim 10, further including time delay fault current responsive means in circuit relationship with means operating said first switch means; said time delay fault current sensing means operatively adjusted to operate said first switch means responsive to predetermined continuous fault conditions of insufficient instantaneous magnitude to effect conduction of said spark gap means.

13. A protective arrangement for a series capacitor bank to be connected to an alternating current power transmission line, comprising in combination: a fast acting spark gap means, connected across said capacitor bank, to break down and become conducting when said capacitor bank is subjected to a predetermined instantaneous fault condition; bypass means rapidly responsive to conduction of said spark gap means to provide a shunt circuit across said spark gap device, extinguishing the arc across said spark gap means; restoring means rapidly responsive to the removal of the fault condition to interrupt said shunt circuit, reinserting said capacitor bank in operative series relationship in said alternating current power transmission line; said protective arrangement being characterized by the ability to reinsert said capacitor bank within ten cycles after the initiation of the fault condition while preventing the reinsertion of said capacitor bank during the period the fault condition remains; said bypass and restoring means include first and second electromagnetic switch members, respectively; said first and second switch members including first and second actuating coils, respectively; said first actuating coil being connected to an energizing source in circuit relation with means responsive to arc gap conduction; said second actuating coil being connected to an energizing source in circuit relation with means rapidly responsive to the clearing of the fault condition.

14. The protective arrangement of claim 13, further including means for applying a stream of air through said spark gap means after the arc thereacross has been extinguished; said air stream being of sufficient strength and duration to substantially remove the ionized gases from said spark gap means, the strength and duration of said air stream substantially less than that required to extinguish the arc.

15. The protective arrangement of claim 13, further including a line condition sensing means, said line condition sensing means responding to the clearing up of the fault condition within the first cycle after said bypass means shunt circuit is completed.

References Cited by the Examiner

UNITED STATES PATENTS

| | | | |
|---|---|---|---|
| 2,660,693 | 11/1953 | Marbury | 317—12 |
| 2,664,525 | 12/1953 | Diebold | 317—12 |
| 2,819,429 | 1/1958 | Skeats | 317—12 |

STEPHEN W. CAPELLI, *Primary Examiner.*

SAMUEL BERNSTEIN, *Examiner.*

R. V. LUPO, *Assistant Examiner.*